United States Patent [19]

Saigne

[11] 4,271,977
[45] Jun. 9, 1981

[54] CLOSING DEVICE FOR A TANK FOR A HYDROCARBON OR LIKE LIQUID

[75] Inventor: Gerard Saigne, Larche, France

[73] Assignee: Paumellerie Electrique, France

[21] Appl. No.: 64,475

[22] Filed: Aug. 7, 1979

[30] Foreign Application Priority Data

Aug. 8, 1978 [FR] France ................. 78 23359
Feb. 26, 1979 [FR] France ................. 79 04804

[51] Int. Cl.³ .................................. B65D 51/16
[52] U.S. Cl. .................................. 220/371; 55/523; 55/524; 55/529
[58] Field of Search ............... 55/159, 522-528; 220/203, 371-374, DIG. 33

[56] References Cited

U.S. PATENT DOCUMENTS

| 2,117,369 | 5/1938 | Shaw | 220/371 |
| 2,298,938 | 10/1942 | Griffin, Jr. et al. | 55/523 X |
| 2,675,093 | 4/1954 | McCall et al. | 220/371 |
| 3,199,716 | 8/1965 | Price | 220/374 X |
| 3,631,654 | 1/1972 | Riely et al. | 55/524 X |

Primary Examiner—Charles N. Hart
Assistant Examiner—Richard W. Burks
Attorney, Agent, or Firm—Robert E. Burns; Emmanuel J. Lobato; Bruce L. Adams

[57] ABSTRACT

A device comprises a cap formed by a body (4) provided with a base (8) which is biased outwardly by a spring (12) and carries an annular sealing element having a lip (10). The base is provided with a center orifice (14). Mounted on the outer face of the base (8) is a sealing element (20) which is also provided with a center orifice. A filtering element (18) is clamped between the element (20) and the lipped element (10) and closes the orifice (14) so as to substantially preclude the passage of the liquid while allowing the passage of air. The filtering element is formed for example by a tablet which may be partly protected by a thin and impermeable diaphragm (110).

15 Claims, 10 Drawing Figures

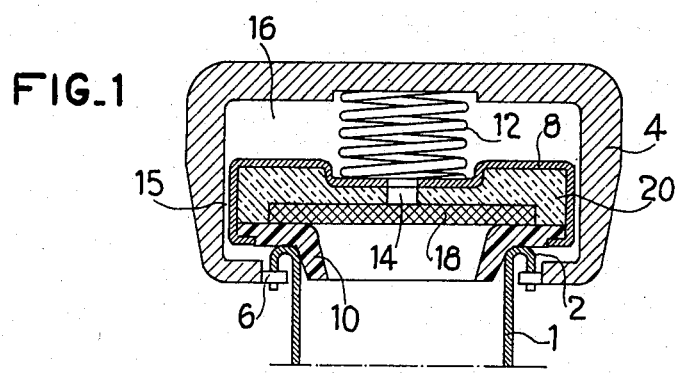
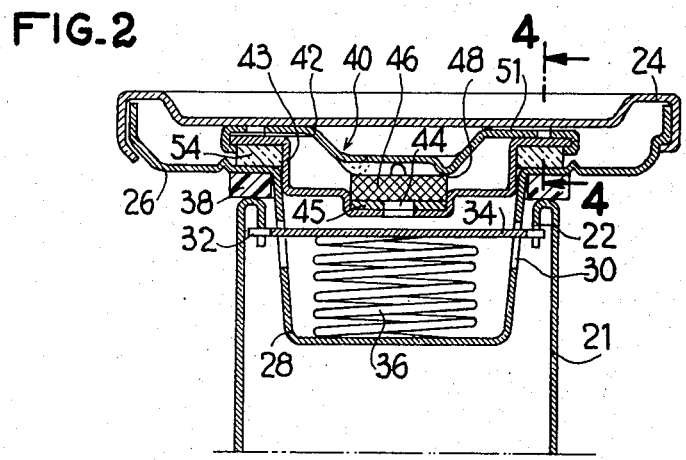
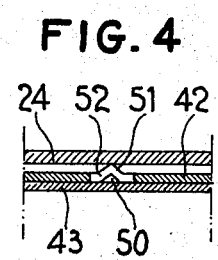
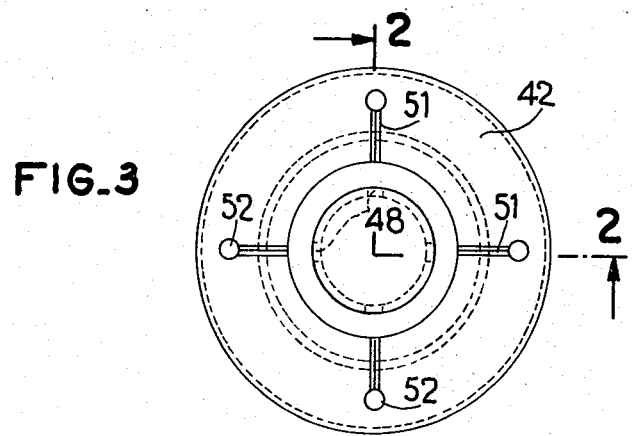

FIG_5
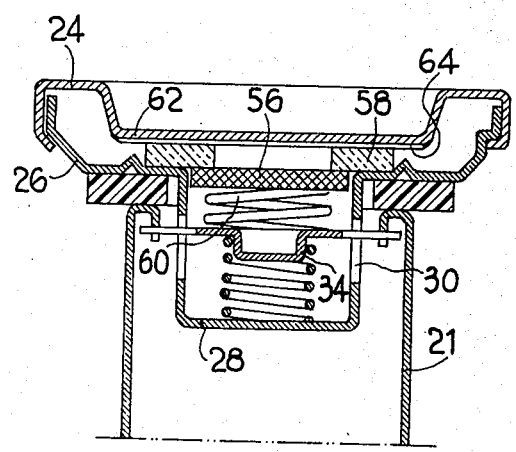
FIG_6
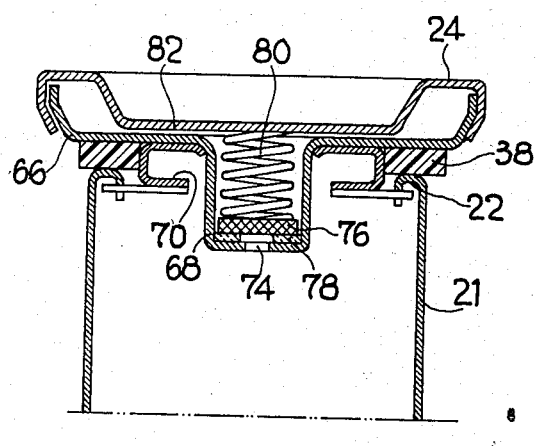

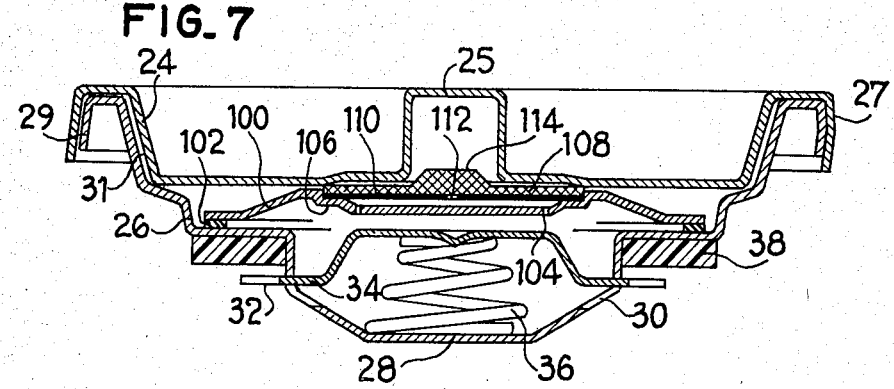
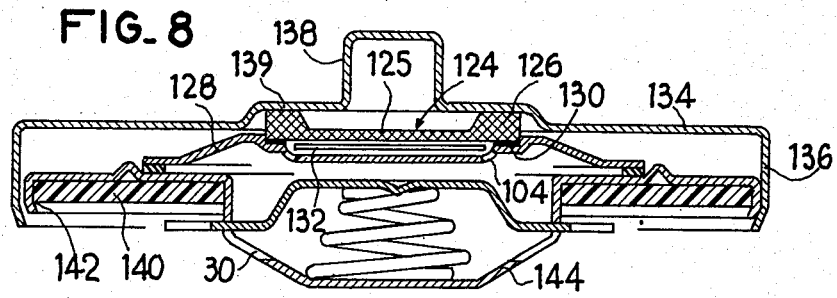
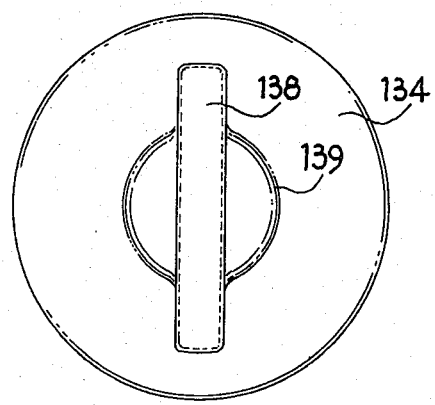
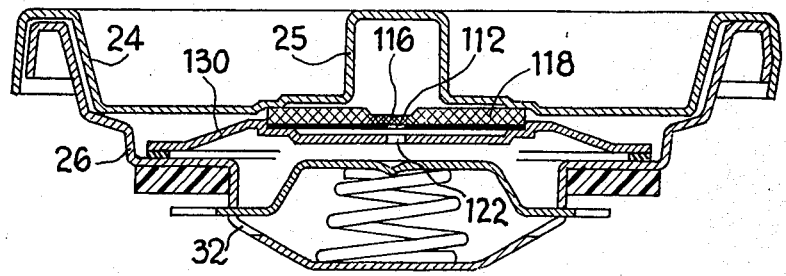

CLOSING DEVICE FOR A TANK FOR A HYDROCARBON OR LIKE LIQUID

DESCRIPTION

A tank containing a hydrocarbon, propane or like product must never be closed in a strictly sealed manner. An air passage allowing communication between the outside atmosphere and the inside of the tank must always be provided so as to maintain the correct pressure inside the tank. Unfortunately, when the tank must be transported or constitutes the fuel tank of an automobile vehicle and is liable to be accidentally inverted, the air passage is converted into a liquid passage by way of which the contents of the tank escape. Owing to the very nature of the product contained in these tanks, such an escape of product may be extremely dangerous.

An object of the invention is to overcome this drawback and to provide a closing device which allows the required passage of air but precludes any escape of liquid.

According to the invention there is provided a closing device provided with a venting passage which comprises an air filter which closes this passage at a point.

According to a preferred embodiment, the filter comprises a flat filtering tablet one of the sides of which is applied against a sealing ring which surrounds its centre part.

The tablet is, for example, of sintered metal, such as bronze, of low porosity, for example impregnated with a substance such as a polyethylene resin and/or a silicone.

By way of a modification, the filter may include a filtering element of a compressed plastics material which may be impregnated but is nonetheless porous.

According to another modification, the filter further comprises a very thin airtight diaphragm which covers the major part of the side of the filtering element remote from the inlet of the outside air in the venting passage but which is sufficiently flexible to be separated from this side by the air pressure.

In a preferred embodiment, the filtering tablet is carried by a cup which is provided with at least one outlet orifice adjacent the tank and the diaphragm is interposed between the filtering tablet and this cup.

According to the utilization and the embodiment of the closing device, the assembly comprising the filtering element and the sealing ring is mounted directly in this device where the filter comprises two cups which are clipped to each other on their periphery and enclose therebetween the filtering element and the sealing ring, each of the cups being provided with an aperture for communication with the exterior.

Whatever the embodiment, the closing device thus provided allows the passage of the air from the exterior to the interior of the tank, or in the opposite direction, but ensures, irrespective of the inclination of the tank, a closure which satisfies the definition of impermeability to the liquid required in this field, that is to say it only allows an escape of liquid less than 28.5 g/min under a pressure of 0.08 bar.

The features and advantages of the invention will be apparent from the ensuing description of embodiments of the invention which are given solely by way of example and shown in the drawings.

In the drawings:

FIG. 1 is a sectional view of a closing device according to the invention in the position of use on a pipe of the tank;

FIG. 2 is a sectional view, taken on line 2—2 of FIG. 3, of a modification;

FIG. 3 is a top plan view of the filter of the closing device of FIG. 2;

FIG. 4 is a sectional view taken on line 4—4 of FIG. 2 to an enlarged scale;

FIGS. 5 and 6 are views similar to FIGS. 1 and 2 of two other modifications of the device according to the invention;

FIG. 7 is a radial sectional view of another modification of the closing device according to the invention;

FIG. 8 is a view similar to FIG. 7 of another embodiment of the closing device;

FIG. 9 is a diagrammatic top plan view of the device of FIG. 8 to a reduced scale, and FIG. 10 is a view similar to FIGS. 7 and 8 of another modification of the invention.

The device shown in FIG. 1 is more particularly adapted to close a tank of hydrocarbon, propane or like liquid, whose inlet pipe 1 terminates in an outwardly curved edge portion 2. This device comprises a hollow body 4 provided with tongues 6 for locking to the edge portion 2 of the pipe. Inside the body 4 a base 8 carries a sealing element 10 having a lip which is clamped against the curved edge portion 2 of the pipe 1 by a coil spring 12 mounted between the base 8 and the body 4. The base 8 has a dimension slightly less that of the body 4 so that there is provided therebetween, throughout the periphery of the cap, a clearance which allows the passage of air. Further, the base 8 is provided with a centre orifice 14 which puts the peripheral clearance 5 and the inner cavity 16 of the body 4 in communication with the tank.

According to the invention, a filtering element 18 in the form of a flat tablet is clamped between the lipped sealing element 10 and a sealing element 20 which fills the space between this sealing element 10 and the base 8 all around the orifice 14.

With this arrangement, when the closing device is mounted on the pipe 1, the exterior air can enter this pipe and the tank by way of the peripheral clearance 15, the cavity 16 and the orifice 14, and then the filtering element 18, or issue from the pipe in flowing in the opposite direction. The filtering element 18 is so chosen as to ensure the free circulation of the air but to preclude any passage of liquid. For this purpose, the tablet 18 is preferably of sintered metal, such as bronze, which has low porosity and is for example impregnated with a substance such as polyethylene resin and/or silicone so as to reduce the size of its pores.

The filtering element may also be constructed from a porous plastics material, for example a foam of plastics material, preferably impregnated and/or compressed in such manner as to reduce the size of the passages therethrough and increase its density. Whatever the embodiment thereof, the filtering element precludes the passage of particles of a size greater than, or equal to, one micron.

Thus, even when the tank is inverted and the pipe 1 is inclined, the liquid contained in the tank is never liable to escape to the exterior. On the other hand, no liquid can enter the tank.

When the tank, which must be closed with the closing device of the invention, comprises, as shown in FIG. 2, a pipe 21 whose edge portion 22 is bent inwardly, there is preferably employed a device according to a modification. This device has an outer cover 24 whose upper side is press-formed so as to define at least one diametral or cross-shaped inner rib, this cover being formed over at evenly spaced points of its periphery onto a base 26 which defines an extension 28 which extends into the pipe 21. Lateral slits 30 formed in this extension 28 allow the passage of tongues 32 which are rigid with a plate 34 which is biased toward the cover 24 by a spring 36. The tongues 32 cooperate with slots formed in the formed-over edge portion 22 so as to secure the cap to the pipe 21.

In the same way as the device of FIG. 1, the device of FIG. 2 has a peripheral clearance allowing the passage of air between the exterior of the cap and the tank, whereas a sealing ring 38 closes the junction between the base 26 and the formed-over edge portion 22 of the pipe 21.

Mounted between the base 26 and the cover 24 is a filter which is generally indicated by the reference 40. This filter comprises two cups respectively 42 and 43. The lower cup 43 is provided with a centre orifice 44 and carries around this orifice a sealing element 45 and a filtering element 46 which is constituted, in the same way as the filtering element 18, by sintered metal or by a plastics material. The filtering element 46 is held in close contact with the sealing ring 45 by a number (preferably four) of small bosses 48 which are press-formed in the end wall of the cup 42. Further, the cup 42 has four radial grooves 50 which are formed by a press operation and constitute four ribs 51 on the upper side of this cup. The grooves 50 define with the edge of the lower cup 43 air passages which put the inner space between the two cups in communication with an orifice 52 (communicating with the exterior of the filter) of the rib 51.

The filter 40 is mounted between the base 26 and the cover 24 in such manner that the cup 43 is fitted in the extension 28 of the base 26 and bears against this base through a sealing element 54. The grooves 51 are in contact with the inner ribs of the cover 24 and the latter clamps them so as to apply the assembly of the filter in a sealed manner against the sealing element 54 and preclude any passage of air between this filter and the base 26.

On the other hand, air can circulate by way of the peripheral clearance, the space between the grooves 51 and the inner rib of the cover 24, the apertures 52, the grooves 50, and then pass through the filtering element 46 and the orifice 44 and reach the tank by way of the slots 30 or, of course flow in the opposite direction. This passage, which must pass through the filtering element 46, is forbidden to the liquid and in particular to the liquid contained in the tank owing to the very nature of the filtering element, irrespective of the position of the tank.

The dimensions of the grooves 50 and ribs 51 are extremely small so that they perform the function of dust filters and thereby protect the filtering element 46 against the risk of clogging so that the useful life of this filtering element is considerably prolonged.

According to another modification, a closing device of the same type as that of FIG. 2 is rendered liquidtight owing to a filter which comprises a filtering element formed by a tablet 56 placed in the entrance of the extension 28 in the region of the base 26 of the cap, as shown in FIG. 5. A sealing ring 58 is then mounted all around the entrance of this extension 28 in contact with the base 26 and with the filtering element 56, and a spring 60 which bears against the plate 34 carrying the bayonnet clamping device biases the filtering element 56 against the sealing ring 58. This ring 58 is moreover in close contact with the inner rib 62 of the cover 24 which is preferably circular and has small diametral grooves 64 for the passage of the air.

As in the preceding embodiment, the air can thus flow by way of the peripheral clearance, the space between the base 26 and the cover 24, the narrow passage between the groove or grooves 64 and the sealing ring 58 and then pass through the filtering element 56 and enter the pipe 21 of the tank by way of the slots 30, whereas the liquid contained in the tank, or coming from the exterior, is stopped by the filtering element 56.

In some cases it may however be deemed preferable to arrange that the assembly of the closing device have a smaller overall size. For this purpose, the base 66 has an extension 68 which is narrower and the bayonnet device for fixing to the pipe 21 is carried by a ring 70 mounted on the base 66 outside the extension 68. The sealing ring 38 is then maintained between the edge portion 22, the base 66 and this ring 70. The extension 68 is provided with a centre orifice 24 and the filter is mounted inside this extension against this orifice. This filter comprises a tablet 76 which is clamped against a sealing ring 78 by a coil spring 80 which bears against the cover 24 of the closing device. This cover is press-formed in its centre part so as to have, as in the preceding embodiments, a diametral rib, or two ribs arranged as a cross, or a circular boss 82. The depth of the boss or the rib 82 is such that there remains a slight clearance therebetween and the base 66 and on the periphery of the closing device. The air can consequently flow between the pipe 21 and the exterior by way of the orifice 74, the filtering element 76 and the inner clearance of the closing device. On the other hand, liquids are stopped and can in no case escape from the tank.

It will be understood that the choice of the material constituting the filtering element and its dimensions are determined not only in accordance with the form of the pipe and the tank but also in accordance with the liquid contained in the tank. For example, the tablet may have a slightly conical shape or be prismatic, its end faces having a polygonal, square, circular or other shape.

In some cases, it may be of utility to protect the filtering element constituted by the tablet against risk of clogging under the effect of its contact with the liquid contained in the tank. This protection may be provided, for example, by means of a very thin airtight diaphragm. Examples of devices employing such a diaphragm are shown in FIGS. 7 to 10.

The closing device shown in FIG. 7, as those of the preceding Figures, comprising a cover 24 whose upper side is press-formed so as to form at least one inner groove 25 and a peripheral edge portion or bead 27 which is open in its lower part. This cover is formed over at evenly spaced apart points of its periphery against a base 26 which defines an extension 28 for entering the tank to be closed. The base 26 comprises a peripheral edge portion or bead 29 which is capable of fitting in the bead 27 of the cover 24 while defining a clearance allowing the passage of air between the exterior of the cap and the inner cavity defined by the cover 24 and the base 26. The extension 28 is provided with lateral slots 30 allowing the passage of tongues 32 which are rigid with a plate 34 which is biased toward the cover 24 by a spring 36.

When the closing device is placed in position on the pipe of a tank, the tongues 32 clamp the edge of this tank against a sealing element 38 bearing against the lower face of the base 26.

The inner cavity defined by the cover 24 and the base 26 is divided into two parts by a cup 100 which is applied against the base 26 through a sealing ring 102. The cup 100 is however provided with at least one small orifice 104 which puts the peripheral clearance between the beads 27 and 29 in communication with the slots 30. The orifice or orifices 104 are provided in the centre part of the cup 100 which has a dish shape and defines an annular shoulder 106 supporting an air filter. This filter is formed by a filtering element or tablet 108 which bears on a sealing ring constituted by the peripheral edge portion of an airtight diaphragm 110. The diaphragm 110 is provided with a centre orifice 112 and is extremely thin and flexible. Consequently, it is easily urged back by the air which enters by way of the peripheral clearance 31 between the beads 27, 29, flows through the groove 25 and across the tablet 108, so that this air can escape by way of the orifice 112, the orifices 104 and the slots 30 to the tank on which the closing device is mounted. On the other hand, the liquid contained in the tank which has passed through the slots 30 and the orifices 104, urges the diaphragm 110 against the tablet 108 and applies its against the latter. Consequently, the liquid can only pass through the orifice 112 to reach the tablet 108.

As shown in FIG. 7, this tablet 108 has, preferably in its centre part, a boss or thicker portion 114 which retards the passage of the liquid. Consequently, the escape of hydrocarbon, petrol or other liquid through the tablet 108 can only be very limited. It is practically zero and in any case less than 28.5 g/min at a pressure of the order of 0.08 bar.

On the other hand, the air circulates practically freely. Its flow may be about 0.833 liter/min which ensures a good airing or venting of the tank.

It is clear that the presence of the diaphragm 110 considerably reduces the risk of a wetting of the tablet 108 by the liquid, whereas the presence of the extra thickness 114 in the region of the orifice 112 ensures a valid impermeability of the tablet.

The extra thickness 114 may possibly be replaced by a more compact centre part 116 which, as shown in FIG. 10, may have, on the contrary, less thickness than the remainder of the tablet 108. The formation of this more compact part 116 may be due to the very composition of the tablet which has elements of different grades or different porosities, or to a difference in the treatments of the different parts of the tablet.

According to the chosen form or the densities employed, the tablet 118 which has a denser centre part 116 facing the orifice 112 of the diaphragm 110 may be carried by a cup 100 having a plurality of orifices 104 of the type shown in FIG. 1, or, on the contrary, by a cap 120 having a single centre orifice 122 as shown in FIG. 10.

According to another modification shown in FIGS. 8 and 2, the closing device comprises a filter whose filtering element is formed by a tablet 124 whose centre part 125 is thin whereas its peripheral portion 126 has a distinctly greater thickness. This tablet 124 is, as are the tablets 108 and 118, carried by a cup 128. However, it is preferably applied against a sealing ring 130 which is independent from the thin diaphragm 132 interposed therebetween and the orifices 104 of the cup 128. The diaphragm 132 has a diameter less than the inside diameter of the sealing ring 130, that is to say of the exposed surface of the tablet 124. This diaphragm 132 is free in the space defined between the cup 128 and the tablet 124 and can move under the effect of the air or of the liquid contained in the tank. The air which has passed through the tablet 124 passes round the diaphragm 132 and escapes in the direction of the orifices 104 and the slots 30 by way of the periphery of the diaphragm. On the other hand, the liquid arriving by way of the orifices 104 applies the diaphragm 132 against the tablet 124 and can only enter this tablet by way of a very small annular space on the periphery of the diaphragm 132. Now, this space corresponds to the peripheral extra thickness 126 of the tablet 124.

The filter thus constructed may be mounted in a closing device comprising an outer peripheral bead and a diametral rib, such as those shown in FIGS. 7 and 10, but it may also be mounted in a different closing device, for example that shown in FIG. 8. Such a device comprises a cover 134, which is on the whole flat but has, on one hand, a peripheral skirt 136 and, on the other, a diametral rib 138 above a circular boss 139. Mounted in this cover is a base 140 provided with a peripheral skirt 142 and capable of fitting in the skirt 136 while however defining a peripheral clearance 143 which allows the entry of the exterior air. In this closing device, as in those which have been described hereinbefore, the air which has entered between the cover 134 and the base 140 is necessarily brought by the rib 138 in the region of the filter and must pass through the filtering tablet 124 to reach the orifices of the cup 128 and the slots 30 communicating with the tank.

It will be understood that the filter of the invention may also be mounted in closing devices having different forms.

The diaphragm 110 or 132 is made from an elastomer plastics material which resists the hydrocarbons or other liquids contained in the tank and is airtight, for example a material such as Rhodoid. Its thickness is extremely small and the aperture 112 formed in its centre part is calibrated in accordance with the desired rate of flow of air and petrol.

The filtering element is itself formed by a tablet of sintered metal or a compressed plastics material or a tablet of a sintered plastics material, for example a fluorine-based polymer, such as polyfluoroesther, polyexafluoropropylen, or the like, so as to limit the risk of wetting this tablet with the liquid and in particular a hydrocarbon. The sintered material may be employed as such, with no treatment, when it has geometric dimensions and in particular dimensions of porosity which permit satisfying the conditions of impermeability required of the filtering element. However, generally, it will be preferable to impregnate it in such manner as to reduce its porosity by means of a resin which resists hydrocarbons and preferably has a negative surface tension, for example by means of a urethane resin treated with ethylene oxide so as to render it water-absorbent. The fluorosilicones diluted in a solvent, or the like, may also be employed as the impregnating resin.

Instead of its impregnation, or in additon to the impregnation, the tablet may be moreover subjected to an oxidation, for example an oxidation with air at a temperature of about 450° C., or an anodic oxidation in an electrolytic bath so as to reduce the dimension of the porosity and thereby create negative ions which avoid the risk of wetting of the tablet by the hydrocarbon or the like.

Moreover, in certain cases, it may be of utility to dispose on the surface of the tablet which is exposed to the liquid contained in the tank a thin film of porous plastics material having a surface tension which is very low relative to this liquid, for example a sliding varnish such as that sold under the trademark "Pulvephobe" by the firm GRAPHOIL.

Whatever the embodiment of the tablet and of the associated diaphragm, the closing device thus constructed provides great safety against leakages of the liquid contained in the tank. It will be understood that this closing device may be provided with an anti-theft device or any other like system.

Moreover, the presence in the cup 32 of lateral orifices which are preferably four in number and diametrally opposed, which open onto the periphery of the diaphragm, allows the air to flow from the tank to the exterior and in the opposite direction irrespective of the position of the diaphragm.

Having now described my invention what I claim as new and desire to secure by Letters Patent is:

1. A closing device for an inlet aperture of a tank containing hydrocarbon, propane or like product, the device comprising a cover having an inner rib, a base, means defining an extension which has a first end which is connected to the base and a second end which is adapted to extend into the inlet aperture of the tank, the base and the cover defining a cavity, first passage means putting the cavity in communication with the exterior of the cover, means defining an orifice at said first end of the extension, an air filtering element disposed in said orifice, a sealing ring disposed in the cavity and clamped between said base and the filtering element and said inner rib of the cover, and second passage means for putting said orifice in communication with the interior of the tank by way of said extension.

2. A device as claimed in claim 1, comprising means for locking the device to the tank, slots in said extension in which slots said locking means are movable, and a spring interposed between the filtering element and said means for locking the device to the tank, said slots constituting said second passage means.

3. A device as claimed in claim 1, comprising a filter including said filtering element, a sealing ring abutting the filtering element, two cups having peripheral portions which are clipped together, one of the cups comprising a centre aperture and the othe cup being provided with radially extending press-formed ribs on the peripheral portion thereof, the filtering element and the sealing ring being mounted between the two cups.

4. A device as claimed in claim 3, comprising a cover and a base which define therebetween a cavity, the filter being maintained between a sealing element which bears against the base and an inner rib of the cover.

5. A device as claimed in claim 1, comprising a thin airtight diaphragm which covers the major part of a face of the filtering element remote from an end of said venting passage for entrance of the exterior air, the diaphragm being sufficiently flexible to be moved away from said face by the pressure of said air.

6. A device as claimed in claim 5, wherein the diaphragm is provided with a centre orifice and its periphery constitutes said sealing ring interposed between the tablet and a support for the tablet.

7. A device as claimed in claim 1, wherein the filtering element is in the form of a tablet having an extra thickness in its centre part.

8. A device as claimed in claim 1, wherein the filtering element is in the form of a tablet having a denser centre part.

9. A device as claimed in claim 1, wherein the filtering element is in the form of a tablet having a peripheral thicker portion.

10. A device as claimed in claim 5 or 6, wherein the diaphragm has a diameter slightly less than the inside diameter of the sealing ring and is interposed with clearance between said tablet and a support cup.

11. A device as claimed in claim 5 or 6, wherein the diaphragm is made from a plastics material which resists hydrocarbons, propane or like product.

12. A device as claimed in claim 5 or 6, wherein the diaphragm is made from an elastomer which resists hydrocarbons, propane or like product.

13. A device as claimed in claim 1, wherein a surface of the tablet shaped filtering element which is exposed to the liquid product of the tank is covered with a thin film of porous plastics material having a very low surface tension with respect to said liquid product.

14. An air filter impermeable to liquids for a cap of a tank containing a hydrocarbon or like product, said filter comprising two cups which are clipped together on the periphery of the cups and define a cavity, a tablet which is permeable to air and a sealing ring disposed in the cavity, a lower cup of said cups defining an orifice communicating with the exterior of the device and an upper cup of said cups defining a number of apertures and radially-extending press-formed grooves, the apertures communicating with the grooves, the tablet and the sealing ring being clamped together between the two cups, and the sealing ring being disposed around the orifice.

15. A filter as claimed in claim 14, wherein the upper cup has press-formed localized bosses which are in contact with the filtering element but allow the passage of the air therebetween.

* * * * *